March 10, 1959 E. E. SCHOESSOW 2,877,042
HIGH PRESSURE CLOSURE
Filed July 6, 1955 2 Sheets-Sheet 1

INVENTOR.
EARL E. SCHOESSOW
BY

March 10, 1959  E. E. SCHOESSOW  2,877,042
HIGH PRESSURE CLOSURE
Filed July 6, 1955  2 Sheets-Sheet 2
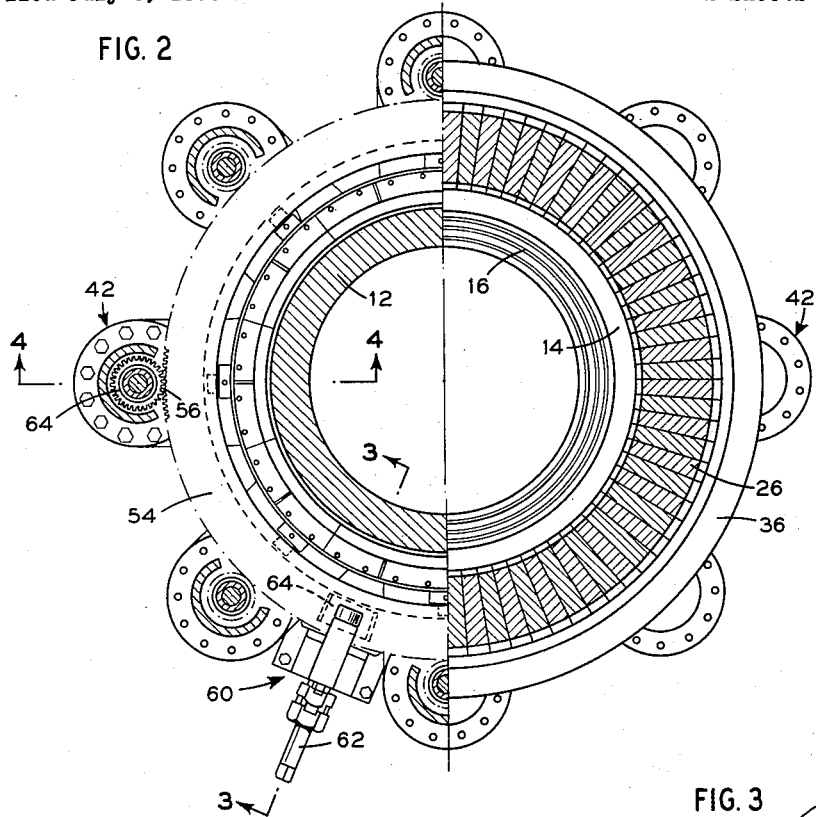
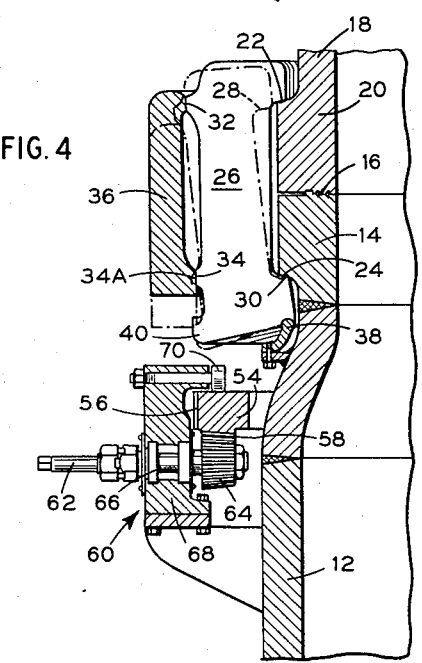
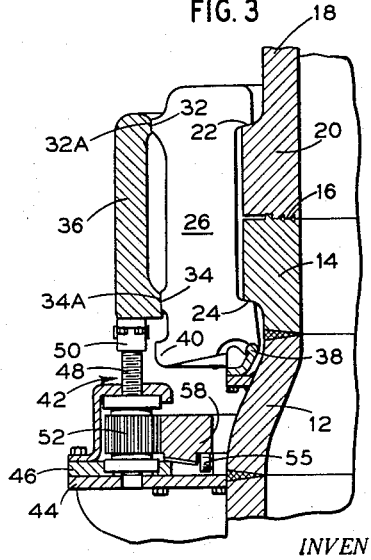
INVENTOR.
EARL E. SCHOESSOW
BY United States Patent Office 2,877,042
Patented Mar. 10, 1959

2,877,042

HIGH PRESSURE CLOSURE

Earl E. Schoessow, Barberton, Ohio, assignor to The Babcock & Wilcox Company, New York, N. Y., a corporation of New Jersey Application July 6, 1955, Serial No. 520,183

5 Claims. (Cl. 292—256)

The present invention relates in general to a high pressure closure for a pressure vessel and more particularly it relates to a mechanical means for making a fluid tight connection between a closure member and a pressure part.

Many of the present-day engineering processes require the use of pressure vessels to contain high pressure and/or high temperature fluids. Usually such processes are operated for a considerable period of time and are only shut down in an emergency or for a scheduled repair period. During such periods it is usual that some maintenance of the equipment within the pressure vessel is necessary. It is therefore desirable to have the closure of the vessel easily removable.

In some installations it is desirable to remove the closure by remote operation. In such cases the use of the well-known expedients such as welding the closure to the pressure vessel and/or the use of heavy bolted mating flanges are not desirable.

The present invention is directed to a pressure vessel having an opening and a closure engageable with the vessel at the opening. The closure and the vessel are so arranged that a number of clamping members disposed around the periphery of the vessel, force the closure into fluid tight relationship with the vessel upon the application of a substantially radial inward force. This force is applied by an axial movement of a clamp ring which encompasses the clamping members and has an inclined plane surface contacting the clamping members. A group of jackscrews arranged about the pressure vessel impart an axial movement to the clamp ring, thus applying radial motion to the clamping members.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described an embodiment of the invention.

Of the drawings:

Fig. 1, a side view showing the pressure vessel closure of the invention;

Fig. 2 is a section transverse to the longitudinal center line taken on the line 2—2 of Fig. 1 and looking in the direction of the arrows;

Fig. 3 is a partial vertical section taken along the line 3—3 of Fig. 2 and looking in the direction of the arrows; and Fig. 4 is a partial longitudinal section taken along the section line 4—4 of Fig. 2 and looking in the direction of the arrows.

Figure 1:
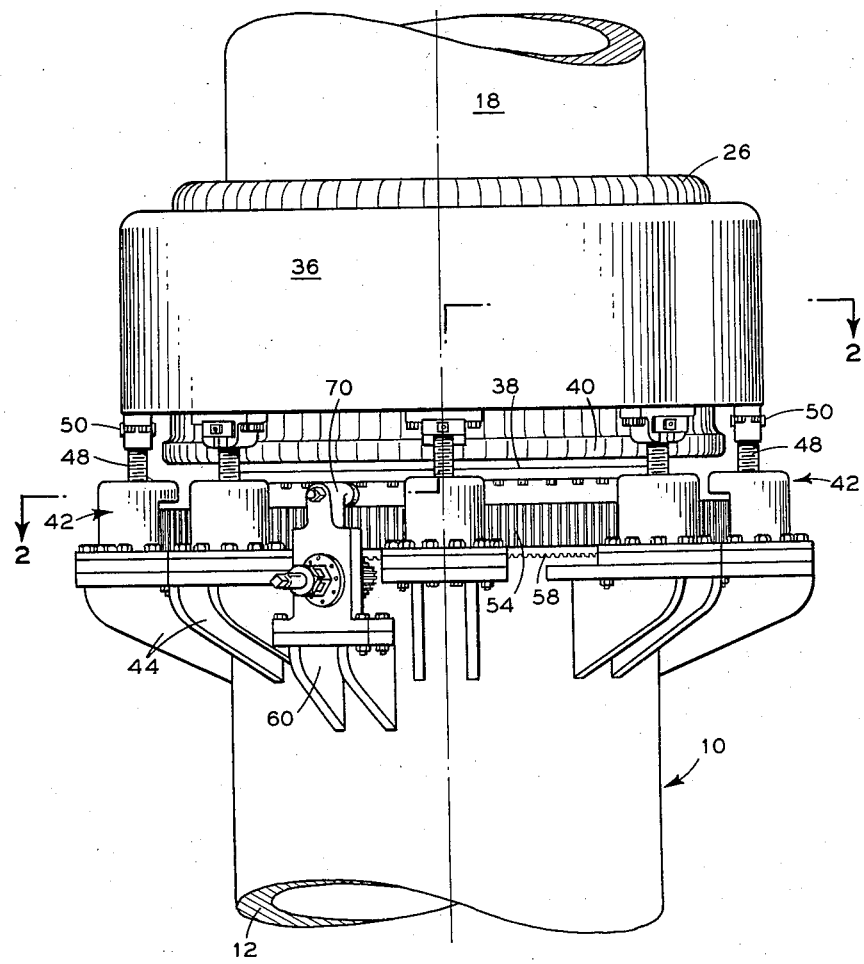

A pressure vessel 10 is formed by the wall 12 and has an opening at its one end at which there is disposed a flange 14. In the face of the flange 14 there are special annular grooves 16 arranged to receive gasket sealing means. A closure member 18 having a flange 20 arranged to match flange 14 of the vessel 10 is placed in contact with the vessel. The flanges 14 and 20 have the inclined plane portion 22 and 24 oppositely arranged and adapted to receive parts of a plurality of C-shaped clamping members 26. These clamping members are circumferentially arranged adjacent to each other and completely surround the periphery of the vessel 10 and closure flanges 14 and 18. Each clamping member has inclined plane surfaces 28 and 30 arranged to match the inclined plane surfaces 22 and 24 of the flanges in such a manner that, upon an application of a substantially radially inward force to the clamping members 26 there results a compressing reaction between the closure flange 18 and the vessel flange 14. This reaction is due to the action between the inclined planes 22, 24, 28 and 30, as the clamping member is forced radially inward.

The outward side of each clamping member is shaped to have vertically disposed inclined plane surfaces 32 and 34. A unitary clamping ring 36 encompases all of the clamping members. This ring has internal inclined plane surfaces 32A and 34A adapted to contact and match the inclined plane surfaces 32 and 34 of the clamping members. Thus, upon the application of an upward axial movement of the clamping ring there results a radially inward force on the clamping members 26 which in turn effectuates a fluid-tight seal between the flanges 14 and 18.

The clamping members 26 are further arranged in such manner that each is supported from the pressure vessel 10 by a pivot ring 38 fixed to the pressure vessel 10. Also, the lower outer end of each clamping member is arranged with a projection 40 such that upon the downward axial travel of the clamping ring 36, and as the inward force on the clamping member is released, each clamping member is pivotally moved about the pivot ring 38, so that the upper portion of each clamping member 26 clears the outer edge of the closure flange 18. The movement of the clamp ring 36 and the clamping members during this closure releasing operation is indicated in dotted lines in Fig. 4. The shape of each clamping member 26 at the pivot 38 and the action of the clamping ring in its releasing movement allows the fluid tight closure flange 18 to be removed from the pressure vessel when the clamp ring 26 is at its dotted line position.

In the present embodiment axial motion is imparted to the clamp ring 36 by a plurality of jackscrews 42, each of which is mounted from and at spaced positions around the pressure vessel 10. Each jackscrew consists of a base support 44 arranged to hold the jackscrew base 46. The jackscrew has a screw member 48 having a bearing top 50 which drives the clamp ring 36 and the screw member 48 is driven by pinion gear 52 non-rotatively fixed relative to the screw member. All of the jackscrews are mounted at the same height and are adjusted so that they will uniformly impart vertical or axial motion to the clamp ring 36. This uniform motion of the jackscrews is obtained by a unitary and annular bull gear 54 which is supported on roller bearings 55 and which surrounds the pressure vessel. The gear 54 has teeth 56 on its outer periphery and bevel gear teeth 58 on its lower side in order that a circular or rotating movement of the bull gear causes its outer peripheral teeth to drive each one of the pinions 52.

As shown in Fig. 4, the bull gear 54 is driven by a power input drive 60 which consists of a power application shaft 62 rotating a pinion 64 which in turn rotates bull gear 54. The input drive 60 is suitably supported in bearings 66 in the support housing 68. Further, the housing 68 contains an upper roller bearing 70 which is arranged to maintain the rolling position of the bull gear 54.

The present invention is a pressure vessel closure arrangement which provides a novel means for compressing the closure onto the vessel by using clamping members which transform a radial inward force into a longitudinal compression. This clamping may be done at any suitable number of locations around the periphery of the pressure vessel and closure depending upon the rigidity of such a closure under the operating fluid pressures and temperatures within the vessel. Therefore, the present invention is not restricted to the clamping members completely surrounding the pressure vessel but it is understood that the invention may be carried out with a number less than shown in the preferred embodiment.

Further, the radial inward force on the clamping members may be supplied by means other than a unitary ring having an inclined surface bearing against the inclined plane surface bearing against the clamping members. For example, the inward force may be obtained by reducing the circumference of a band.

The power driven bull gear and driven jackscrews produce a uniform axial movement required in the clamping ring by the application of force to the bull gear at a single point, thus providing a unit which is capable of remote operation.

While in accordance with the provisions of the Federal Statutes there is illustrated and described herein a specific form of the invention, those skilled in the art will understand that changes may be made in the form of the apparatus disclosed without departing from the spirit of the invention covered by the claims, and that certain features of the invention may be sometimes used to advantage without simultaneous use of the other features.

What is claimed is:

1. In combination, walls forming a pressure part of circular cross-section having an opening therein, a closure member engageable with the pressure part at said opening, a plurality of clamping members arranged to force said closure member on to and in fluid tight relationship with said pressure part by the application of a substantially radial inward force, a clamp driving ring encompassing said clamping members and arranged with an inclined plane surface contacting said clamping members, said clamp driving ring being arranged to positively actuate said clamping members and disengage them from the closure member upon the removal of the substantially radially inward force by the axial movement of said ring, and power application means connected to said pressure part for imparting to and controlling a uniform axial movement of said clamp driving ring to both tighten the closure member.

2. In combination, walls forming a pressure part of circular cross-section having an opening therein, a closure member engageable with the pressure part at said opening, a plurality of clamping members arranged to force said closure member on to and in fluid tight relationship with said pressure part by the application of a substantially radial inward force, a clamp driving ring encompassing said clamping members and arranged with an inclined plane surface contacting said clamping members, a plurality of jackscrews positioned about the pressure part and arranged to bear on said ring to impart an axial movement thereto, each of said jackscrews having a driving nut arranged with gear teeth on the external surface thereof, and means for driving each of said jackscrews to impart a uniform axial movement of said clamping ring.

3. In combination, walls forming a pressure part of circular cross-section having an opening therein, a closure member engageable with the pressure part at said opening, a plurality of clamping members arranged to force said closure member on to and in fluid tight relationship with said pressure part by the application of a substantially radial inward force, a clamp driving ring encompassing said clamping members and arranged with an inclined plane surface contacting said clamping members, a plurality of jackscrews positioned about the pressure part and arranged to bear on said ring to impart an axial movement thereto, each of said jackscrews having a driving nut arranged with gear teeth on the external surface thereof, a bull gear arranged to mesh with each of the geared nuts of said jackscrews, and means for rotating said bull gear.

4. In combination, walls forming a pressure part of circular cross-section having an opening therein, a closure member engageable with the pressure part at said opening, a plurality of clamping members arranged to force said closure member on to and in fluid tight relationship with said pressure part by the application of a substantially radial inward force, a clamp driving ring encompassing said clamping members and arranged with an inclined plane surface contacting said clamping members, and means for uniformly imparting axial motion to said clamp driving ring, said clamping members being pivotally connected to said pressure part, said clamp driving ring being arranged to move said clamping members on their pivots upon removal of the substantially radial inward force and to free the closure member for removal thereof.

5. In combination, walls forming a pressure part of circular cross-section having an opening therein, a closure member engageable with the pressure part at said opening, a plurality of clamping members arranged to force said closure member on to and in fluid tight relationship with said pressure part by the application of a substantially radial inward force, a clamp driving ring encompassing said clamping members and arranged with an inclined plane surface contacting said clamping members, and a plurality of jackscrews positioned about the pressure part and arranged to bear on said ring to impart an axial movement thereto, each of said jackscrews having a driving nut arranged with gear teeth on the external surface thereof, a bull gear arranged to mesh with each of the geared nuts of said jackscrews, means for rotating said bull gear, said clamping members being pivotally connected to said pressure part, said clamp driving ring being arranged to move said clamping members on their pivots upon removal of the substantially radial inward force and to free the closure member for removal thereof.

References Cited in the file of this patent
UNITED STATES PATENTS

| | | |
|---|---|---|
| 1,826,947 | Nelson | Oct. 13, 1931 |
| 2,166,999 | Needham et al. | July 25, 1939 |
| 2,625,296 | Parr | Jan. 13, 1953 |
| 2,752,183 | Doll | July 26, 1956 |